United States Patent
Nakajima et al.

(10) Patent No.: US 7,428,187 B2
(45) Date of Patent: Sep. 23, 2008

(54) ULTRASONIC SENSOR

(75) Inventors: Akira Nakajima, Okazaki (JP); Hiroyuki Kani, Okazaki (JP); Yasuhiro Kawashima, Okazaki (JP); Tadao Shimizu, Chita (JP)

(73) Assignee: Denso Corporation (JP)

( * ) Notice: Subject to any disclaimer, the term of this patent is extended or adjusted under 35 U.S.C. 154(b) by 67 days.

(21) Appl. No.: 11/699,323

(22) Filed: Jan. 30, 2007

(65) Prior Publication Data

US 2007/0230273 A1    Oct. 4, 2007

(30) Foreign Application Priority Data

Mar. 15, 2006   (JP) ............... 2006-071290

(51) Int. Cl.
 *G01D 11/24* (2006.01)
(52) U.S. Cl. ...................... 367/140; 367/188
(58) Field of Classification Search ............... 367/140, 367/188, 173, 165, 909; 73/661, 632; 340/435
See application file for complete search history.

(56) References Cited

U.S. PATENT DOCUMENTS

| | | | |
|---|---|---|---|
| 6,759,950 B2 | 7/2004 | Nishimoto et al. | |
| 7,240,555 B2 * | 7/2007 | Kawashima | 367/99 |
| 2004/0061599 A1 | 4/2004 | Li | |
| 2006/0022844 A1 | 2/2006 | Kawashima | |
| 2007/0220981 A1 * | 9/2007 | Nakajima et al. | 73/661 |
| 2007/0230273 A1 * | 10/2007 | Nakajima et al. | 367/140 |
| 2007/0230274 A1 * | 10/2007 | Nakajima et al. | 367/140 |

FOREIGN PATENT DOCUMENTS

| | | |
|---|---|---|
| DE | 198 39 598 A1 | 3/2000 |
| DE | 10 2004 037 257 A1 | 2/2006 |
| EP | 1460391 A1 * | 9/2004 |
| JP | 2004-251665 | 9/2004 |

OTHER PUBLICATIONS

German Office Action, issued in counterpart German Application No. 102007011171.3 dated Jun. 9, 2008 with English translation.

* cited by examiner

*Primary Examiner*—Dan Pihulic
(74) *Attorney, Agent, or Firm*—Nixon & Vanderhye PC

(57) ABSTRACT

A structure is used to prevent an ultrasonic sensor from being damaged by a spring member provided for a bezel. A metal spring is fixed in a groove in a bezel. By setting depth of the groove to be larger than thickness of the metal spring, the metal spring is positioned on the inside further than an open end of the bezel. With the configuration, the metal spring is prevented from coming into direct contact with an ultrasonic transducer. Thus, a vibration face of the ultrasonic transducer is prevented from being damaged.

7 Claims, 8 Drawing Sheets

ULTRASONIC SENSOR

CROSS REFERENCE TO RELATED APPLICATION

This application is based on and claims the benefit of priority of Japanese Patent Application No. 2006-71290 filed on Mar. 15, 2006, the disclosure of which is incorporated herein by reference.

FIELD OF THE INVENTION

The present invention relates to an ultrasonic sensor having an ultrasonic transducer (microphone) including a piezoelectric element.

BACKGROUND INFORMATION

A conventional ultrasonic sensor has, for example, a sensor body with an ultrasonic transducer installed therein attached to the bumper of a vehicle. Ultrasonic waves are generated by the ultrasonic transducer and, by receiving reflection waves of the ultrasonic waves, an obstacle existing near the bumper is detected.

FIG. 12 is a partial cross section showing a structure of fixing the conventional ultrasonic sensor 100 to a bumper 101. As shown in the diagram, a sensor body 102 of the ultrasonic sensor 100 has a circular column shape. By inserting the sensor body 102 in a circular hole 101a formed in the bumper 101 from the outside of the bumper 101, the sensor body 102 is fixed to the bumper 101. More practically, a flange 102a is provided at the rear end in the direction of insertion to the bumper 101 in the sensor body 102, and a V-shaped metal spring 103 is provided around the outer periphery of the sensor body 102. Consequently, when the sensor body 102 is inserted in the hole 101a in the bumper 101, in a state where movement in the insertion direction of the sensor body 102 is regulated by the flange 102a, the widening force in the radial direction of the sensor body 102 generated by the metal spring 103 is applied to the wall face constructing the hole 101a of the bumper 101, so that the sensor body 102 is firmly fixed to the bumper 101 (refer to, for example, U.S. Pat. No. 6,759,950).

In recent years, the ultrasonic sensor is becoming intelligent, and a circuit board on which not only an ultrasonic transducer but also a signal processing circuit and the like are formed is being housed in the sensor body. The sensor body is accordingly enlarged, and a problem occurs such that the sensor body cannot be inserted in the hole in the bumper from the outside of the bumper. Therefore, by a structure different from a conventional structure, the ultrasonic sensor has to be fixed to the bumper.

To address the problem, the inventors of the present invention have devised a structure in which a bezel (cover) formed in a cylindrical shape and having a flange at its one end is provided. The bezel is fixed by being inserted from the outside of a bumper into a hole in the bumper. After that, by inserting a circular column portion in which an ultrasonic transducer is disposed in the sensor body into the hollow in the bezel from the inside of the bumper (that is, in the direction opposite to the direction of insertion to the hole in the bezel), the sensor body is fixed to the bumper via the bezel.

In the case of such a structure, the large sensor body has to be held by the bezel functioning as a fixing member. Consequently, the bezel has to be firmly fixed to the bumper, and the sensor body has to be firmly fixed to the bezel. Thus, the inventors have devised a structure of providing a spring member such as a metal spring for a side wall of a bezel and fixing the bezel to the bumper or fixing the sensor body to the bezel by using elastic reaction force of the spring member.

At the time of inserting the sensor body to the bezel, however, there is a possibility that the sensor body comes into contact with the spring member and is damaged. It can cause problems such that a vibration face of the ultrasonic transducer is damaged, the function of the ultrasonic sensor deteriorates, and appearance of the sensor body does not look good.

SUMMARY OF THE INVENTION

In view of the problems, an object of the present invention is to prevent an ultrasonic sensor from being damaged by a spring member provided for a bezel in the case of fixing the sensor body to a vehicle body part such as a bumper via the bezel.

In an aspect of the present disclosure, an ultrasonic sensor includes a bezel in a cylindrical shape with an opening on one end and a hollow space housed therein, and a sensor body having an ultrasonic transducer. A side wall of the bezel has a groove that extends from an opening side end of the bezel to an outer side of the side wall, and a metal spring is fixed in the groove. Further, a portion of the sensor body is formed as an insertion portion for insertion into the hollow space of the bezel. The bezel is inserted in a hole of a component from an outside of the component before having the insertion portion of the sensor body being inserted from an inside of the component into the hollow space in a course of assembly operation on the component of, for example, a vehicle, and the metal spring stays back from both sides of the groove at the opening side end of the bezel by being housed in the groove. In this manner, the metal spring is being prevented from coming into a direct contact with the transducer, thereby avoiding damage on a vibration surface of the transducer.

The bezel may preferably have a tapered shape at both sides of the groove. Further, a border between an opening end of the bezel and the groove may preferably be rounded at one end.

In another aspect of the disclosure, the ultrasonic sensor has the groove that extends on an inside surface of a side wall of the bezel, and thickness of the metal spring is made thinner than a depth of the groove. In this manner, the metal spring stays back from the inside surface of the side wall of the bezel, thereby being prevented from having contact with the vibration surface.

BRIEF DESCRIPTION OF THE DRAWINGS

Other objects, features and advantages of the present invention will become more apparent from the following detailed description made with reference to the accompanying drawings, in which.

DETAILED DESCRIPTION

Figure 1:
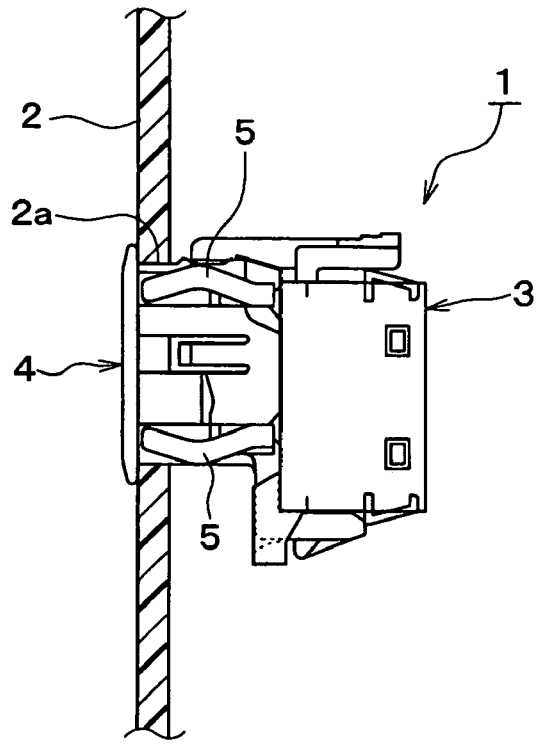
FIG. 1 shows a side view of an ultrasonic sensor attached to a bumper in a first embodiment of the present disclosure.

Embodiments of the present invention will be described below with reference to the drawings. In the following embodiments, the same reference numerals are assigned to parts which are the same or equivalent to each other in the drawings.

First Embodiment

An ultrasonic sensor according to a first embodiment of the invention will be described. An ultrasonic sonar of the present embodiment is attached to, for example, a bumper of a vehicle and is used as a back sonar or a corner sonar.

FIG. 1 is a side view showing a state in which an ultrasonic sensor 1 of the embodiment is attached to a bumper 2. In FIG. 1, only the bumper 2 is shown as a section.

As shown in the diagram, the ultrasonic sensor 1 is fixed in a hole 2a in the bumper 2. The ultrasonic sensor 1 has a configuration including the sensor body 3 and a bezel 4. The bezel 4 is inserted into the hole 2a in the bumper 2 from the outside of the bumper 2 (i.e., from the left side of the drawing) and, after that, the sensor body 3 is inserted into the hollow in the bezel 4 from the inside of the bumper 2 (i.e., from the right side of the drawing), thereby fixing the ultrasonic sensor 1 to the bumper 2.

The detailed structure of the sensor body 3 and the bezel 4 will be described below.

Figure 3:
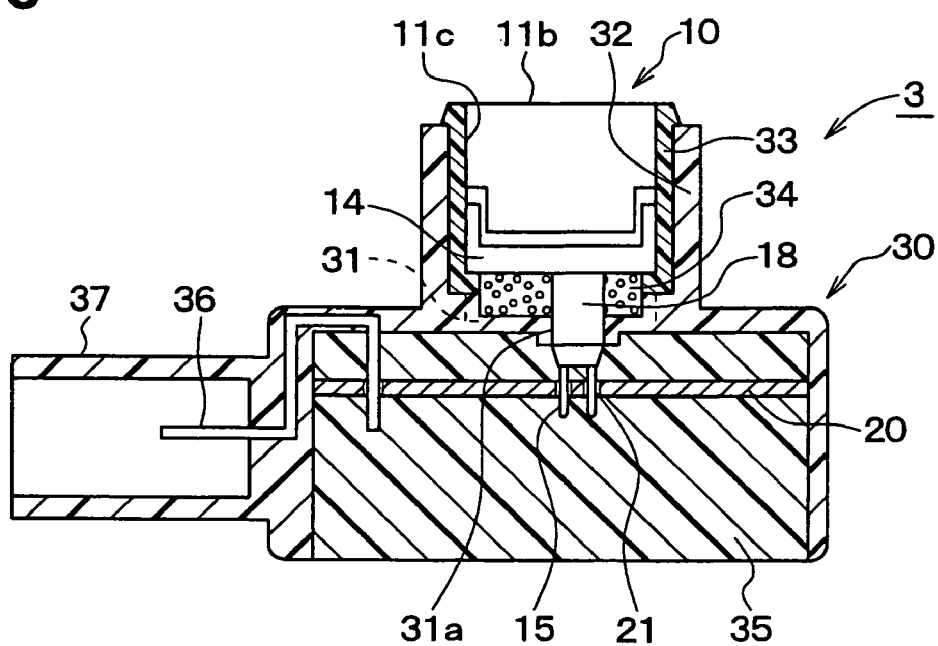
FIG. 3 shows a cross-sectional view of the ultrasonic sensor taken along a line III-III in FIG. 2A in the first embodiment.

FIGS. 2A to 2D are front view, right side view, top view, and rear view, respectively, of the sensor body 3. FIG. 3 is a cross section of the sensor body 3, which is taken along a line III-III in FIG. 2A.

Figure 4:
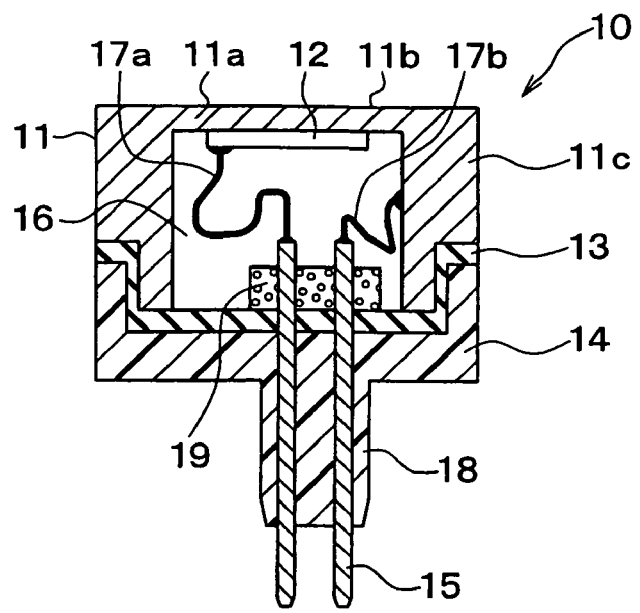
FIG. 4 shows a cross-sectional view of an ultrasonic transducer in the first embodiment.

In the sensor body 3, as shown in FIGS. 2A to 2D and FIG. 3, an ultrasonic transducer 10 and a circuit board 20 are integrally enclosed in a case 30. FIG. 4 is a cross section of the ultrasonic transducer 10 provided for the sensor body 3. As shown in FIG. 4, the ultrasonic transducer 10 has a housing 11, a piezoelectric element 12, a spacer 13, a base 14, and a connection pin 15.

The housing 11 is made of a conductive material (a metal material or an insulating material having a surface on which a conductive film is formed). The housing 11 has a bottomed cylindrical shape and an internal space 16 is formed in the housing 11. The piezoelectric element 12 is adhered to the inner face of a bottom 11a of the housing 11, and the outer surface of the bottom 11a serves as a vibration face 11b. In the embodiment, aluminum is used as the conductive material, and the vibration face 11b has a circular shape.

The piezoelectric element 12 is made of piezoelectric ceramics (for example, lead zirconate titanate) and is provided with electrodes (not shown) on its front surface and rear surface. One of the electrodes of the piezoelectric element 12 is electrically connected to one of the connection pins 15 of the pair via a lead 17a. The other electrode of the piezoelectric element 12 is adhered to the bottom 11a of the housing 11 by, for example, a conductive adhesive, connected to a lead 17b via the housing 11 made of the conductive material and, after that, electrically connected to the other connection pin 15. The internal space 16 of the housing 11 is filled with felt or silicon so that unnecessary vibrations transmitted from the vibration surface to the connection pins 15 are suppressed.

The spacer 13 is disposed between the opening in the housing 11 and the base 14. The spacer 13 is an elastic member for suppressing transmission of the unnecessary vibrations generated in a cylindrical portion 11c of the housing 11 in association with vibrations of the bottom 11a of the housing 11 to the base 14 to which the connection pins 15 are fixed. The spacer 13 is made of, for example, silicon rubber. Although the configuration of disposing the space 13 is used in the present embodiment, a configuration having no spacer 13 can be also employed.

The base 14 is fixed to the housing 11 by being fit in the peripheral surface on the opening side of the housing 11. The base 14 is made of an insulating material such as a synthetic resin (for example, ABS resin). To the base 14, a protection portion 18 for covering the connection pins 15 is provided so as to project to the circuit board 20 side. The connection pins 15 are disposed so as to penetrate the protection portion 18. By insert-molding the connection pins 15 at the time of forming the base 14, a part of the connection pins 15 is buried and fixed in the base 14.

Each of the connection pins 15 is mainly made of a conductive material such as copper and is constructed by a rod member having a thickness of, for example, 0.5 mmφ (i.e., having the diameter of 0.5 mm).

Further, the ultrasonic transducer 10 has a foam elastic member 19 made of, for example, foam silicon. The foam elastic member 19 is used to suppress transmission of vibration to the base 14, and the connection pins 15 are disposed so as to penetrate also the foam elastic member 19.

The housing 11, spacer 13, base 14, and foam elastic member 19 are adhered to each other with an adhesive (such as silicon adhesive), thereby forming the ultrasonic transducer 10 as an integral structure.

By assembling the ultrasonic transducer 10 constructed as described above together with the circuit board 20 into the hollow case 30 made of the synthetic resin, the ultrasonic sensor 1 is constructed.

The case 30 is constructed by a hollow rectangular-parallelepiped shape. The case 30 has a guide 31 for positioning the connection pines 15 in a connection position in the circuit board 20. The guide 31 is constructed by a plate member which partitions the internal space of the case 30 into a space in which the ultrasonic transducer 10 is disposed and a space in which the circuit board 20 is disposed. The guide 31 has a positioning hole 31a into which the connection pins 15 and the protection portion 18 are inserted.

One face (the upper face in the drawing sheet in FIG. 3) of the case 30 is an open face 32 whose top face shape is a circular shape. By inserting the ultrasonic transducer 10 into the open face 32, the ultrasonic transducer 10 is assembled in the case 30. The outer peripheral surface of the ultrasonic transducer 10 is covered with a cylindrical elastic member 33, and a foam elastic member 34 as an elastic member that suppresses vibrations is disposed below the base 14 in the ultrasonic transducer 10. In a state in which the ultrasonic transducer 10 is assembled in the case 30, the connection pins 15 are inserted in the positioning hole 31a in the guide 31, and the tip portions of the connection pins 15 are inserted in through holes 21 formed in the circuit board 20. The tip portions of the connection pins 15 and the through holes 21 are electrically connected to each other by soldering or the like.

The vibration face 11b of the ultrasonic transducer 10 is exposed from the open face 32 of the case 30 and ultrasonic waves generated by the ultrasonic transducer 10 are transmitted to the outside of the case 30.

The cylindrical elastic member 33 is made of silicon rubber and is adhered to the outer peripheral surface of the ultrasonic transducer 10 (the surface of the cylindrical portion 11c of the housing 11) and the bottom face of the ultrasonic transducer 10 in order to suppress transmission of unnecessary vibrations from the ultrasonic transducer 10 to the case 30.

Like the foam elastic member 19 disposed in the housing 11 of the ultrasonic transducer 10, the foam elastic member 34 is made of silicon foam, and the connection pins 15 and the protection portion 18 are disposed so as to penetrate the foam elastic member 34. There is a cut portion in the foam elastic member 34, and the protection portion 18 can be inserted in the cut portion. The ultrasonic transducer 10 (base 14), the cylindrical elastic member 33, and the foam elastic member 34 are fixedly adhered to each other by a silicone adhesive.

The hollow in which the circuit board 20 is disposed in the case 30 partitioned by the guide 31 is filled with a moisture-proof member 35. As the moisture-proof member 35, for example, a silicone resin or urethane resin can be applied. In the present embodiment, a silicone resin is applied. As shown in FIG. 3, an external output terminal 36 for output from the circuit board 20 to the outside is provided, and one end side of the external output terminal 36 is exposed from a connector 37 formed in one face of the case 30.

Further, as shown in FIGS. 2A to 2D, a lance 38 is provided on the top face (the upper side of the drawing in FIG. 2A) of the case 30, and a receiving part 39 is provided in the bottom face (the lower side of the drawing in FIG. 2A) of the case 30.

The lance 38 is a nail-shaped retaining part formed so as to project from the top face of the case 30 in the same direction as that of the open face 32, and is used for fixation to the bezel 4. More practically, the lance 38 has a rod part 38a and a nail part 38b. The rod part 38a is projected from the top face of the case 30 in the same direction as that of the open face 32, and the nail part 38b is formed on the open face 32 side in the tip position of the rod part 38a.

Figure 2A:
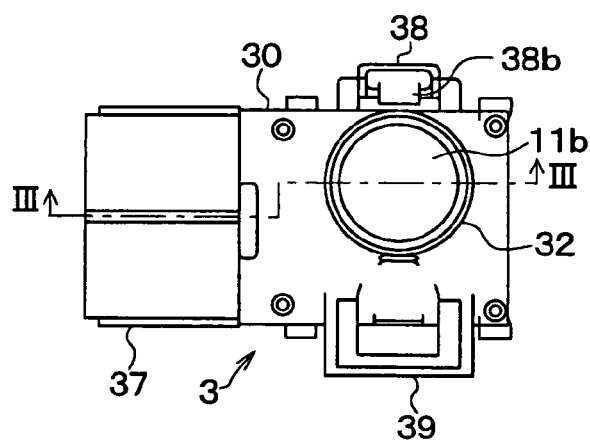
FIGS. 2A to 2D shows illustrations of the ultrasonic sensor in a front/right side/top/rear view in the first embodiment.
Figure 2C:
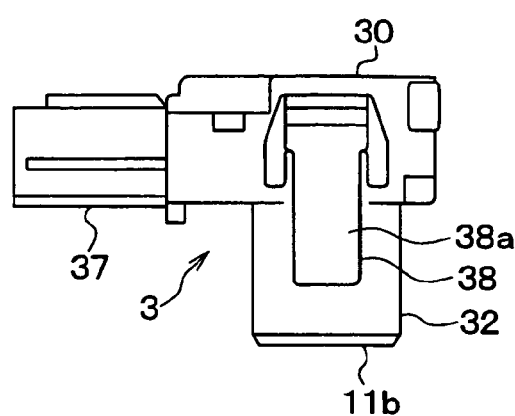
Figure 2B:
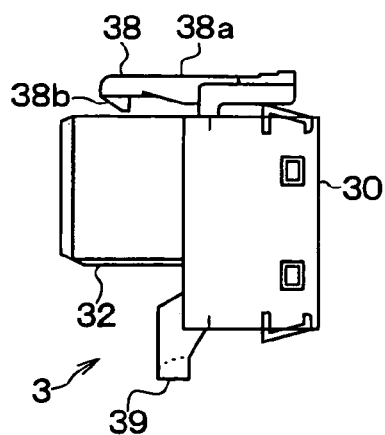
Figure 2D:
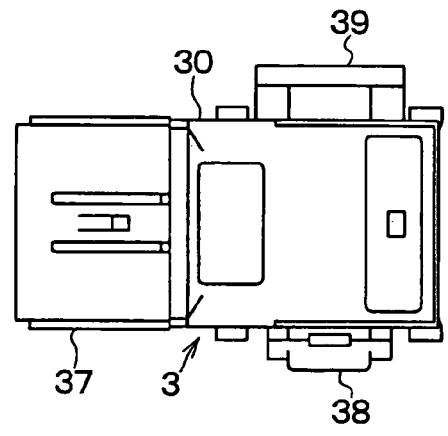

A receiving part 39 is a frame-shaped retaining part provided so as to project downward from the bottom face of the case 30, and is also used for fixation to the bezel 4. More practically, as shown in FIGS. 2A and 2D, the receiving part 39 has a square frame shape when viewed from the projection direction of the open face 32. A snap fit 4b provided for the bezel 4 which will be described later can be inserted in the hole in the receiving part 39.

The portion of the ultrasonic transducer 10 and the open face 32, in the sensor body 3 constructed as described above, that is, the cylindrical projected portion of the case 30 is an insertion portion to be inserted in the bezel 4. Therefore, the projection direction of the open face 32 is the insertion direction of the sensor body 3 to the bezel 4.

Figure 6:
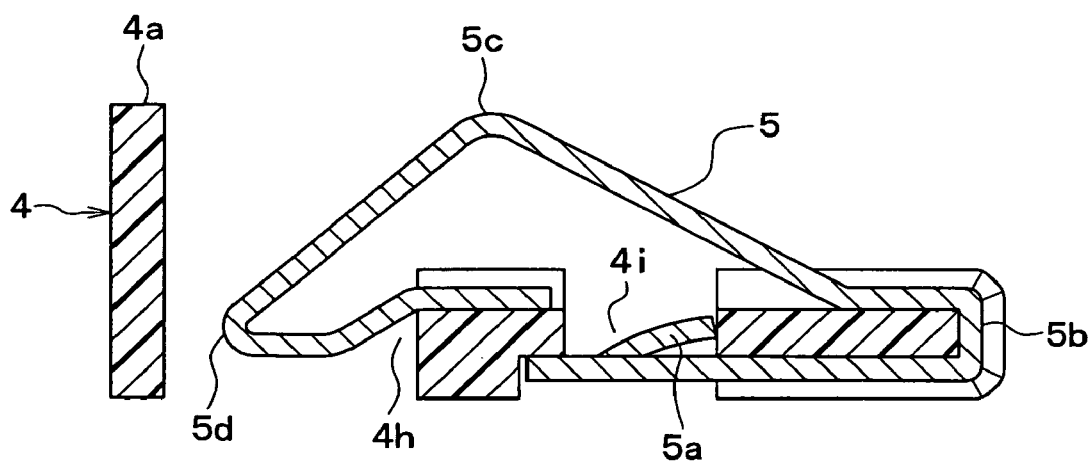
FIG. 6 shows a partially enlarged cross-sectional view of the bezel taken along a line VI-VI in FIG. 5C in the first embodiment.

FIGS. 5A, 5B, 5C, 5D, and 5E are a front view, left side view, rear view, top view, and bottom view, respectively, of the bezel 4. FIG. 6 is a partially enlarged cross section of the bezel 4, taken along a line VI-VI of FIG. 5C.

As shown in FIGS. 5A to 5D, the bezel 4 is constructed by an almost cylindrical member made of a material such as a resin softer than a metal. A flange 4a whose diameter is partly enlarged is formed at one end of the bezel 4. The shape and size of the hollow of the bezel 4 correspond to those of the open face 32 in the sensor body 3. In the hollow, the open face 32 and the ultrasonic transducer 10 are inserted.

A snap fit 4b is provided for the under face of the bezel 4. The snap fit 4b functions as a nail-shaped retaining part. As shown in FIG. 1, by inserting a nail 4c formed at the tip of the snap fit 4b into the hole in the receiving part 39 of the case 30, the snap fit 4b is retained by the receiving part 39. With the configuration described above, the bezel 4 and the sensor body 3 are fixed more firmly. Slits 4j are formed on both sides of the nail 4c, so that the nail 4c disposed between the slits 4j is susceptible to stress deformation.

A retaining hole 4d is formed in the top face of the bezel 4. The retaining hole 4d is a hole having a square shape when viewed from front, in which the nail 38b of the lance 38 provided for the case 30 is to be inserted. As shown in FIG. 1, when the nail 38b of the lance 38 is inserted in the retaining hole 4d, the nail 38b is retained by the inner wall of the retaining hole 4d. With the configuration described above, firmness of the fixation between the bezel 4 and the sensor body 3 is increased.

Figure 5A:
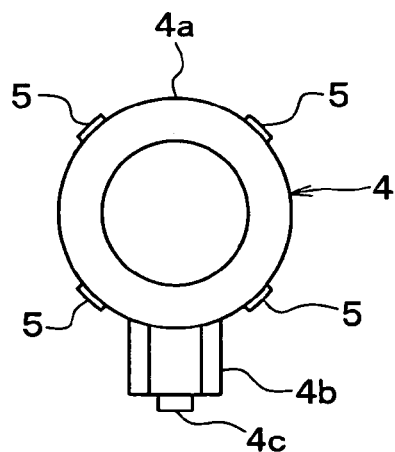
FIGS. 5A, 5B, 5C, 5D, and 5E show illustrations of a front/left side/rear/top/bottom view of a bezel in the first embodiment.
Figure 5C:
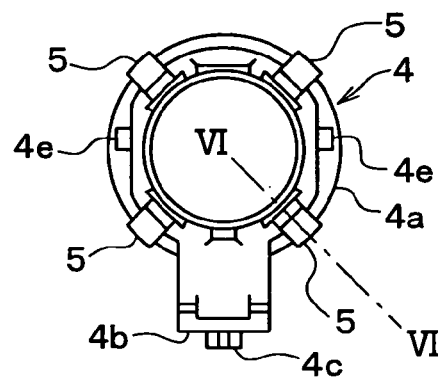
Figure 5B:
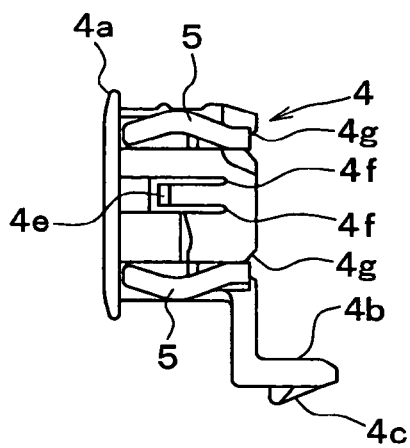
Figure 5D:
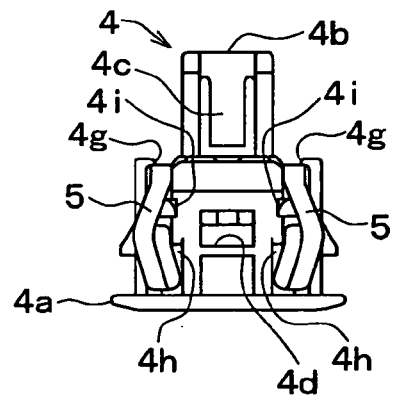
Figure 5E:
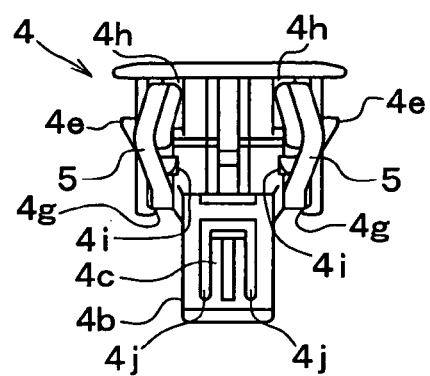

Retaining nails 4e are provided in positions on both right and left sides of the bezel 4 in the outer peripheral surface of the bezel 4. The retaining nails 4e are formed in positions that takes the thickness of the bumper 2 into consideration. Specifically, the retaining nails 4e are provided in positions apart from the end face of the flange 4a by the amount of the thickness of the bumper 2 or slightly larger. The retaining nails 4e are provided to prevent the bezel 4 from coming off from the bumper 2. After attaching the bezel 4 to the bumper 2, at the time of inserting the open face 32 of the case 30 in the sensor body 3 into the bezel 4, a force is applied in the direction that the bezel 4 comes off from the bumper 2. Consequently, when the bezel 4 is inserted in the bumper 2, the retaining nails 4e are retained by the end face of the bumper 2, so that the bezel 4 can be prevented from coming off from the bumper 2. As shown in FIG. 5B, the slits 4f are provided on both sides of each of the retaining nails 4e and the rod part between the slits 4f is susceptible to stress-deformation, so that the retaining nails 4e do not hinder insertion at the time of attachment to the bumper 2.

Further, in the bezel 4, a plurality of (in the present embodiment, four) grooves 4g are formed at equal intervals with respect to the center of the bezel 4 so as to extend from the outer face of the side wall of the bezel 4 to the inner face. As shown in FIG. 6, through holes 4h and 4i in two positions arranged along the center axis of the bezel 4 are formed in each of the grooves 4g. A metal spring 5 is disposed along each of the grooves 4g.

Figure 7A:
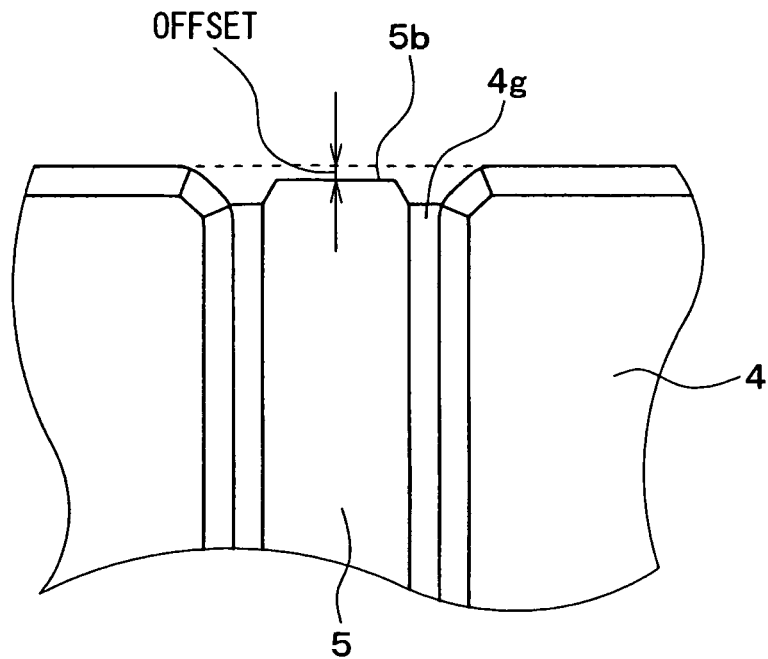
FIGS. 7A and 7B show enlarged illustrations of grooves on the bezel in the first embodiment.
Figure 7B:
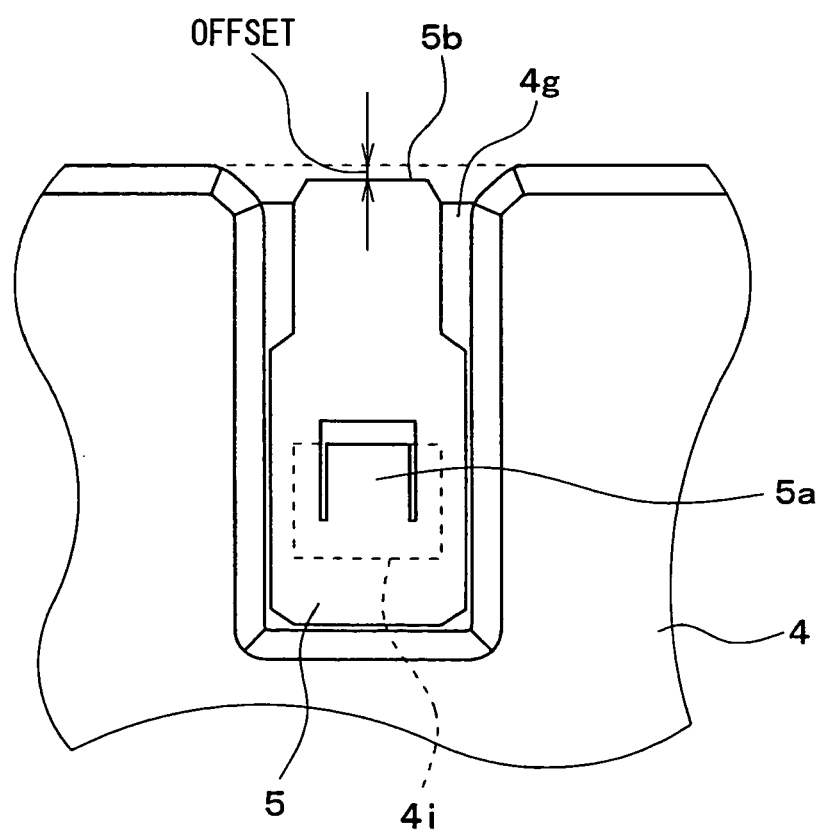

FIGS. 7A and 7B are enlarged views of a portion of the groove 4g on the opening end side of the bezel 4. FIG. 7A is an illustration of the groove 4g viewed from the outside of the bezel 4. FIG. 7B is an illustration of the groove 4g viewed from the hollow of the bezel 4.

As shown in the illustrations, the groove 4g formed in the inner face and the outer face of the bezel 4 is also formed at the opening end of the bezel 4. The depth of the groove 4g is set to be larger than the thickness of the metal spring 5. Consequently, as shown in FIGS. 7A and 7B, the metal spring 5 is positioned on the inside more than the open end of the bezel 4 so as to have some offset from the open end of the bezel 4. Further, as shown in FIG. 6, the metal spring 5 is positioned on the inside further than the inner peripheral face of the bezel 4 so as to have some offset from the inner peripheral face of the bezel 4.

As shown in FIGS. 7A and 7B, a shape is employed such that, on both sides of the grooves 4g in the open end of the bezel 4 and the outer and inner peripheral faces of the bezel 4, the side wall of the groove 4g is tapered so that an acute angle is not formed on both sides of the groove 4g. The portions which are tapered (called tapered portions in the following description) are also rounded in the border positions between the tapered portion and the open end and between the outer and inner peripheral faces of the bezel 4. Therefore, formation of an acute angle on both sides of the groove 4g can be further prevented.

The metal spring 5 is formed by bending a thin rod-shaped metal. The metal spring 5 has a nail 5a obtained by bending one end of the rod-shaped metal in a nail shape, a U-shaped part 5b bent in a U shape in accordance with the shape of the end of the opening of the bezel 4, a projection part 5c projected in the radial direction from the outer peripheral surface of the bezel 4, and a folded part 5d obtained by folding the other end of the rod-shaped metal to the nail 5a side. When the nail 5a of the metal spring 5 is inserted from the open end of the bezel 4 until the U-shaped part 5b comes into contact with the open end of the bezel 4, the nail 5a enters the through hole 4i and is retained by the end face of the through hole 4i, thereby fixing the metal spring 5 to the bezel 4. Consequently, the side fixed to the bezel 4 of the metal spring 5, that is, the U-shaped part 5b serves as the fixing end, and the folded part 5d serves as the free end, thereby playing the spring function.

More practically, at the free end of the metal spring 5, the side faces of the bumper 2 and the open face 32 in the sensor body 3 come into contact with the metal spring 5. The elastic force of the metal spring 5 is applied in the direction of spreading in the radial direction of the bezel 4 to the bumper 2. The elastic force of the metal spring 5 is applied in the contraction direction in the radial direction of the bezel 4 to the open face 32 in the sensor body 3.

Consequently, in the structure of fixing the sensor body 3 to the bumper 2 via the bezel 4, the bezel 4 can be firmly fixed to the bumper 2, and the sensor body 3 can be firmly fixed to the bezel 4. Thus, the ultrasonic sensor 1 can be firmly fixed to the bumper 2.

Figure 8:
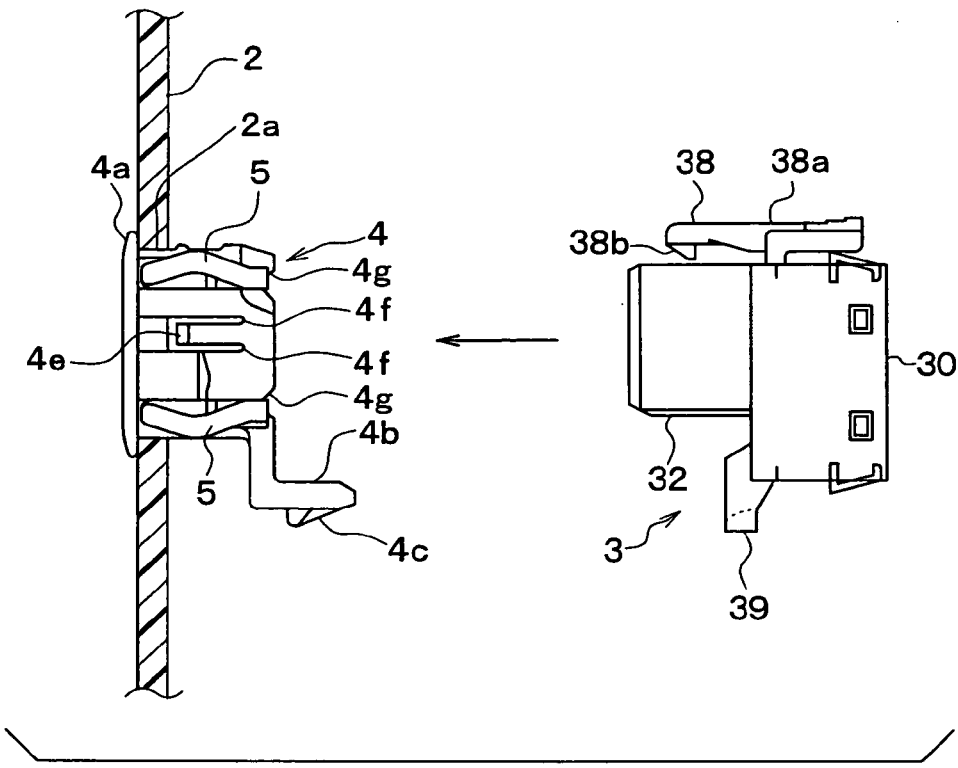
FIG. 8 shows an illustration of the ultrasonic sensor before attachment to the bumper in the first embodiment.

Next, a state where the ultrasonic sensor 1 is attached to the bumper 2 will be described. FIG. 8 is an illustration showing a state before attachment of the ultrasonic sensor 1 to the bumper 2.

Figure 9:
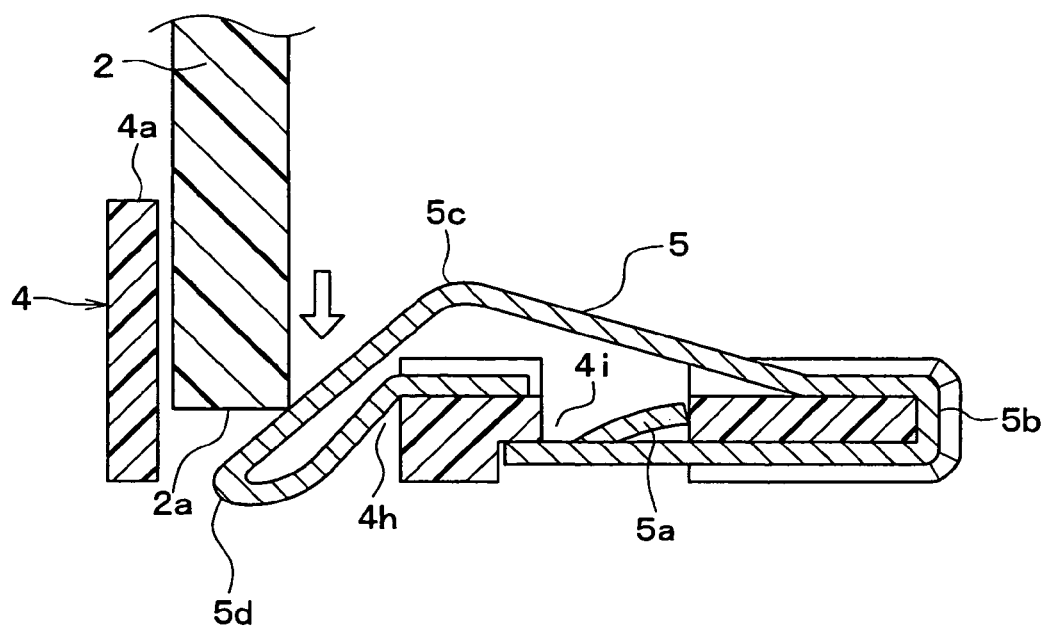
FIG. 9 shows an enlarged cross-sectional view of a portion of the bezel at the time of insertion into the bumper in the first embodiment.

As shown in FIG. 8, first, the bezel 4 is inserted from one side of the bumper 2, that is, the outer side of the bumper 2 into the hole 2a in the bumper 2 until the retaining nail 4e fits in the bumper 2. The open end of the hole 2a in the bumper 2 and the inclined portion of the projection part 5c in the metal spring 5 come into contact with each other. FIG. 9 is a partially enlarged cross section showing the state at this time.

As shown in the illustration in FIG. 9, when the bezel 4 is inserted in the hole 2a in the bumper 2, the metal spring 5 is elastically deformed by the open end of the hole 2a in the bumper 2, the folded part 5d as a free end of the metal spring 5 enters the through hole 4h and is projected out from the inner wall face of the bezel 4.

After that, as shown by the arrow in FIG. 8, the open face 32 and the ultrasonic transducer 10 in the sensor body 3 are inserted in the hollow of the bezel 4 from the other side of the bumper 2, that is, the inside of the bumper 2. At this time, the metal spring 5 is fixed in the groove 4g in the bezel 4 and the depth of the groove 4g is larger than the thickness of the metal spring 5. Consequently, the metal spring 5 is positioned on the inside more than the open end of the bezel 4. Therefore, the metal spring 5 does not come into direct contact with the ultrasonic transducer 10. Even if the ultrasonic transducer 10 comes into contact with the bezel 4, the ultrasonic transducer 10 comes into contact with, not the hard metal spring 5 but the open end of the bezel 4 made of a material such as resin softer than metal.

Therefore, the vibration face 11b of the ultrasonic transducer 10 can be prevented from being damaged. In particular, in the case of the present embodiment, the both sides of the groove 4g in the open end of the bezel 4 are tapered and the border portion between the tapered portion and the open end is rounded. With the configuration, the vibration face 11b of the ultrasonic transducer 10 can be more reliably prevented from being damaged. As a result, degradation in the function of the ultrasonic transducer 10 due to a damage on the vibration face 11b of the ultrasonic transducer 10 can be prevented.

When the open face 32 and the ultrasonic transducer 10 in the sensor body 3 are inserted in the hollow of the bezel 4, the tip of the snap fit 4b is fit in the hole in the receiving part 39. At this time as well, the metal spring 5 is positioned on the inside further than the inner wall face of the groove 4g. Therefore, also in the case where the ultrasonic transducer 10 and the open face 32 slide along the inner wall face of the bezel 4, the ultrasonic transducer 10 and the open face 32 are not damaged by the metal spring 5. In particular, in the present embodiment, since the both sides of the groove 4g are tapered and the border portion between the tapered portion and the inner peripheral face of the bezel 4 has a rounded shape, the effect is obtained more reliably.

When the insertion is continued, the nail 4c formed between the slits 4j comes into contact with the inner wall of the receiving part 39 and is elastically deformed. After the nail 4c is inserted in the receiving part 39, the elastically deformed part regains its original shape, so that the nail 4c and the receiving part 39 come into engagement with each other. The nail 38b of the lance 38 comes into contact with the outer wall face of the bezel 4, and the rod part 38a is elastically deformed. When the nail 38b enters the retaining hole 4d, the elastically deformed part regains its original shape, so that the lance 38 comes into engagement with the retaining hole 4d.

Figure 10:
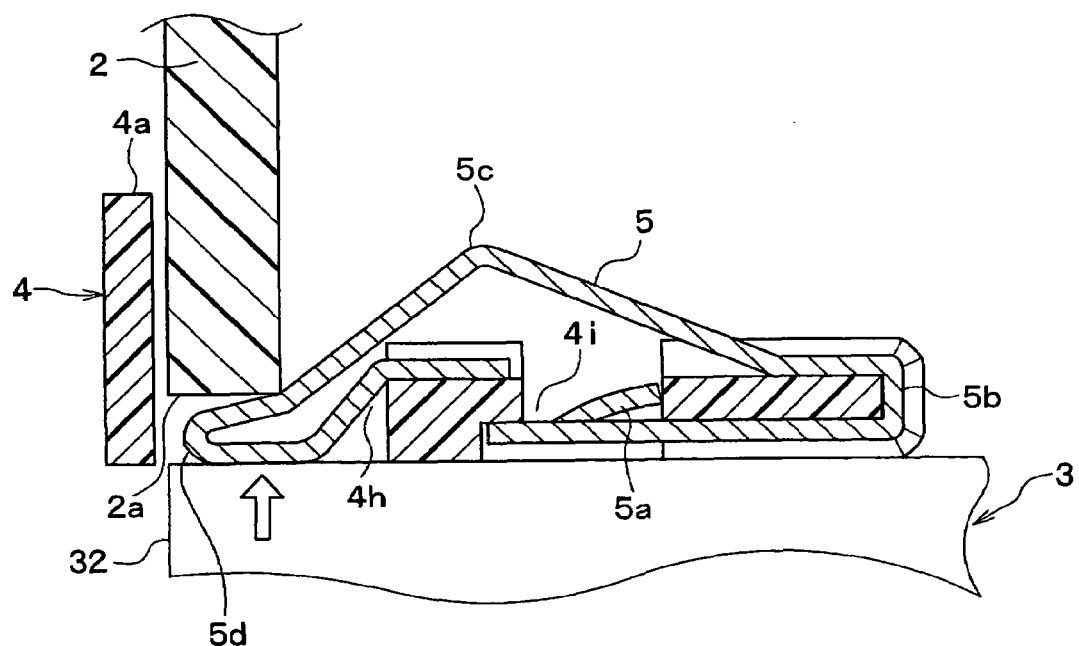
FIG. 10 shows another enlarged view of the portion of the bezel at the time of insertion into the bumper in the first embodiment.

Further, the outer wall face of the open face 32 is fit in the through hole 4h in the bezel 4 in the free end of the metal spring 5 and comes into contact with the portion projected from the inner wall face of the bezel 4. FIG. 10 is a partially enlarged view showing the state at this time.

As shown in the illustration, the free end of the metal spring 5 comes into contact with the external wall face of the open face 32, so that the free end is pushed back in the expanding direction in the radial direction of the bezel 4. Consequently, in the free end of the metal spring 5, the bumper 2 and the side face of the open face 32 in the sensor body 3 come into contact with the metal spring 5. To the bumper 2, the elastic force of the metal spring 5 is applied in the expanding direction in the radial direction of the bezel 4. The elastic force of the metal spring 5 is applied in the contracting direction of the radial direction of the bezel 4 to the open face 32 in the sensor body 3. That is, the free end of the metal spring 5 is elastically compressed between the outer wall face of the open face 32 and the wall face of the hole 2a of the bumper 2. By elastic reaction force accompanying the compressive deformation, the sensor body 3 and the bezel 4 are fixed to the wall face of the hole 2a.

In this manner, in the structure in which the sensor body 3 is fixed to the bumper 2 via the bezel 4, the bezel 4 can be firmly fixed to the bumper 2, and the sensor body 3 can be firmly fixed to the bezel 4. Thus, the ultrasonic sensor 1 can be firmly fixed to the bumper 2.

At the time of inserting the open face 32 and the ultrasonic transducer 10 in the sensor body 3 into the hollow in the bezel 4, the projected portion of the metal spring 5 comes into contact with the open face 32 as shown in FIG. 10, but does not come into contact with the vibration face 11b of the ultrasonic transducer 10. Consequently, the vibration face 11b is not damaged by the metal spring 5.

As described above, in the ultrasonic sensor 1 of the embodiment, the metal spring 5 is fixed in the groove 4g in the bezel 4 and the depth of the groove 4g is set to be larger than the thickness of the metal spring 5, so that the metal spring 5 is positioned on the inside further than the open end of the bezel 4. Consequently, the metal spring 5 can be prevented from coming into direct contact with the ultrasonic transducer 10. Thus, the vibration face 11b of the ultrasonic transducer 10 can be prevented from being damaged.

In the ultrasonic sensor 1 in the present embodiment, the both sides of the groove 4g in the open end of the bezel 4 are tapered and the border portion between the tapered portion and the open end is rounded. Consequently, the vibration face 11b of the ultrasonic transducer 10 can be prevented from being damaged.

Further, also in the hollow in the groove 4g, the metal spring 5 is positioned on the inner side further than the inner wall face of the groove 4g. Consequently, when the ultrasonic transducer 10 and the open face 32 slide along the inner wall face of the bezel 4, the ultrasonic transducer 10 and the open face 32 are not damaged by the metal spring 5.

As described above, in the ultrasonic sensor 1 according to the present embodiment, the vibration face 11b of the ultrasonic transducer 10 can be prevented from being damaged. Thus, degradation in the function of the ultrasonic sensor 1 can be prevented.

Other Embodiments

Although the present invention has been fully described in connection with the preferred embodiment thereof with reference to the accompanying drawings, it is to be noted that various changes and modifications will become apparent to those skilled in the art.

Figure 11:
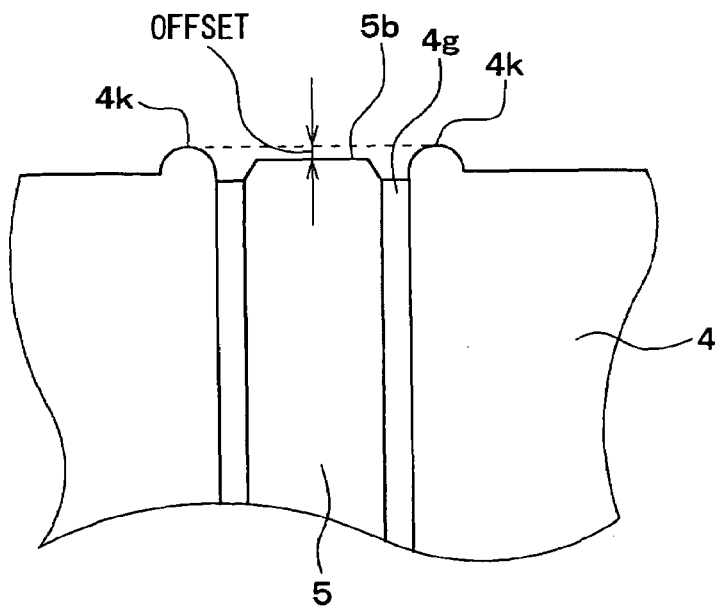
FIG. 11 shows an enlarged illustration of tips of the bezel in other embodiments.
Figure 12:
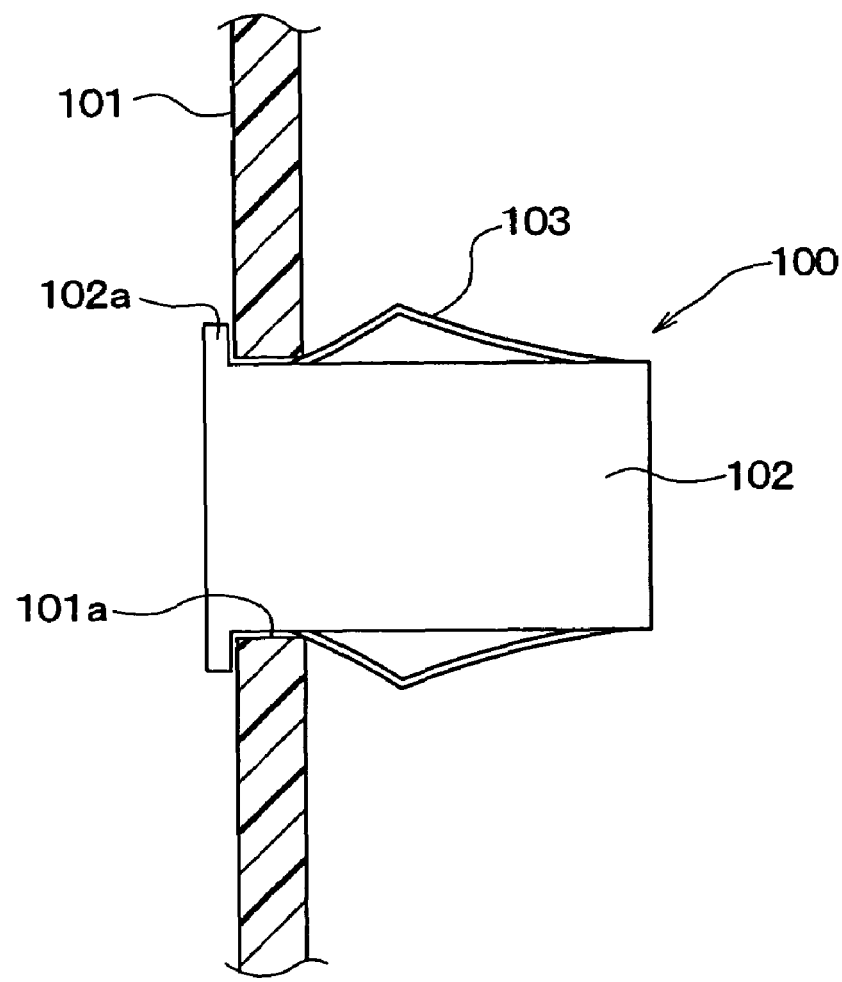
FIG. 12 shows an illustration of a conventional ultrasonic sensor disposed on a bumper.

For example, as shown in FIG. 11, a round protrusion 4k may be provided on both sides of the groove 4g of the bezel 4 for positioning the metal spring 5 further inside of the tip of the protrusion 4k. That is, the tip of the protrusion 4k may take any shape as long as a portion of the metal spring 5 at a most bezel 4 opening end is positioned inside of the opening end of the bezel 4.

Further, the bezel 4 and the sensor body 3 may take a shape that is different from a cylindrical shape as described in the above embodiment. That is, for example, the bezel 4 may take a shape of elliptic cylinder, a polygonal cylinder or the like, and a portion of the sensor 3 that is inserted into the hollow of the bezel 4 may take a shape of the corresponding shape of the elliptic cylinder, the polygonal cylinder or the like.

Furthermore, the ultrasonic sensor may be disposed on a component that is different from the bumper 2 on the vehicle by the above-described structure.

Furthermore, the structure for assembling the ultrasonic sensor in the embodiments described above can be applied to any component that is fixed on a surface of other component such as a bumper surface or the like.

Such changes and modifications are to be understood as being within the scope of the present invention as defined by the appended claims.

What is claimed is:

1. An ultrasonic sensor comprising:
   a bezel in a cylindrical shape with an opening on one end and a hollow space housed therein, wherein a side wall of the bezel has a groove that extends from an opening side end of the bezel to an outer side of the side wall, and a metal spring is fixed in the groove; and
   a sensor body having an ultrasonic transducer, wherein a portion of the sensor body is formed as an insertion portion for insertion into the hollow space of the bezel,
   wherein the bezel is inserted in a hole of a component from an outside of the component before having the insertion portion of the sensor body being inserted from an inside of the component into the hollow space, and
   the metal spring stays back from both sides of the groove at the opening side end of the bezel by being housed in the groove.

2. The ultrasonic sensor as in claim 1,
   wherein an opening end of the bezel takes a tapered shape on the both sides of the groove.

3. The ultrasonic sensor as in claim 2,
   wherein an end of a portion having the tapered shape in the bezel is rounded at a border between the opening end and the groove.

4. The ultrasonic sensor as in claim 1,
   wherein the opening end of the bezel as protrusions on both sides of the groove.

5. The ultrasonic sensor as in claim 1,
   wherein the side wall of the bezel has the groove that extends on an inside surface,
   the metal spring extends on the inside surface of the side wall of the bezel,
   a depth of the groove on the inside surface of the side wall of the bezel is greater than a thickness of the metal spring, and
   the metal spring stays back from the inside surface of the groove at the opening side end of the bezel by being housed in the groove.

6. The ultrasonic sensor as in claim 5,
   wherein the inside surface of the bezel takes a tapered shape on the both sides of the groove.

7. The ultrasonic sensor as in claim 6,
   wherein an end of a portion having the tapered shape in the bezel is rounded at a border between the inside surface and the groove.

* * * * *